United States Patent
Andreoli-Fang et al.

(10) Patent No.: US 10,624,107 B2
(45) Date of Patent: Apr. 14, 2020

(54) SYSTEM AND METHOD FOR NETWORK CONTROLLED DYNAMIC SMALL CELL MANAGEMENT

(71) Applicant: Cable Television Laboratories, Inc., Louisville, CO (US)

(72) Inventors: Jennifer Andreoli-Fang, Boulder, CO (US); Bernard McKibben, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 76 days.

(21) Appl. No.: 15/613,246

(22) Filed: Jun. 4, 2017

(65) Prior Publication Data

US 2017/0339706 A1    Nov. 23, 2017

Related U.S. Application Data

(63) Continuation-in-part of application No. 15/454,668, filed on Mar. 9, 2017.

(60) Provisional application No. 62/345,624, filed on Jun. 3, 2016, provisional application No. 62/357,770, filed on Jul. 1, 2016, provisional application No. 62/345,634, filed on Jun. 3, 2016, provisional application No. 62/353,755, filed on Jun. 23, 2016, provisional application No. 62/339,463, filed on May 20, 2016, provisional application No. 62/306,360, filed on Mar. 10, 2016.

(51) Int. Cl.
*H04W 88/08* (2009.01)
*H04W 72/12* (2009.01)
*H04W 72/04* (2009.01)
*H04W 84/12* (2009.01)
*H04W 88/10* (2009.01)
*H04W 84/04* (2009.01)

(52) U.S. Cl.
CPC ..... *H04W 72/1215* (2013.01); *H04W 72/048* (2013.01); *H04W 88/085* (2013.01); *H04W 84/042* (2013.01); *H04W 84/12* (2013.01); *H04W 88/10* (2013.01)

(58) Field of Classification Search
CPC ... H04W 76/14; H04W 88/10; H04W 88/085; H04W 84/12; H04W 72/048
See application file for complete search history.

(56) References Cited

U.S. PATENT DOCUMENTS 6,157,614 A   12/2000   Pasternak et al.
7,899,451 B2   3/2011   Hu et al.
8,867,490 B1   10/2014   Krishna et al.
(Continued)

OTHER PUBLICATIONS

International Search Report in PCT/US17/21918, dated Aug. 16, 2017.

*Primary Examiner* — Kent Krueger
(74) *Attorney, Agent, or Firm* — David Daniel Smith; Cable Television Laboratories, Inc.

(57) ABSTRACT

A system and method for network controlled dynamic small cell management. The present system backhauls and front hauls LTE data over a network. Portions of the LTE Small Cell are virtualized in the network and either in close communication with a Modem Termination System (MTS) of the network, co-located with the MTS, or integrated with the MTS. Such MTS-Small Cell integration reduces latency through data sharing, LTE-to-network mapping, and distributing workloads.

13 Claims, 12 Drawing Sheets

(56) References Cited

U.S. PATENT DOCUMENTS

| | | |
|---|---|---|
| 8,897,312 B2 | 11/2014 | Pesola |
| 9,754,454 B2 | 9/2017 | Onorato et al. |
| 2005/0159162 A1 | 7/2005 | Park |
| 2008/0020797 A1 | 1/2008 | Denney et al. |
| 2009/0156213 A1 | 6/2009 | Spinelli et al. |
| 2009/0304055 A1 | 12/2009 | Nino et al. |
| 2010/0118752 A1 | 5/2010 | Suzuki et al. |
| 2010/0172368 A1 | 7/2010 | Eng |
| 2010/0284314 A1 | 11/2010 | Pelletier et al. |
| 2012/0287784 A1 | 11/2012 | Shatzkamer et al. |
| 2012/0321312 A1 | 12/2012 | Timm et al. |
| 2013/0010686 A1 | 1/2013 | Shatzkamer et al. |
| 2013/0142157 A1 | 6/2013 | Pesola |
| 2014/0056130 A1 | 2/2014 | Grayson et al. |
| 2014/0328190 A1 | 11/2014 | Lord et al. |
| 2015/0358838 A1 | 12/2015 | Wei et al. |
| 2016/0262169 A1 | 9/2016 | Das et al. |
| 2017/0244539 A1 | 8/2017 | Hanna et al. |
| 2017/0265216 A1* | 9/2017 | Andreoli-Fang ... H04L 12/2801 |
| 2017/0280467 A1 | 9/2017 | Zhu et al. |
| 2017/0330408 A1 | 11/2017 | Onorato et al. |

\* cited by examiner

SYSTEM AND METHOD FOR NETWORK CONTROLLED DYNAMIC SMALL CELL MANAGEMENT

RELATED APPLICATIONS

This patent application claims priority to, and thus the benefit of an earlier filing date from, U.S. Provisional Patent Application No. 62/357,770, filed Jul. 1, 2016, U.S. Provisional Patent Application No. 62/345,634 filed Jun. 3, 2016, U.S. Provisional Patent Application No. 62/353,755 filed Jun. 3, 2016, U.S. Provisional Patent Application No. 62/339,463 filed May 20, 2016, U.S. Provisional Patent Application No. 62/306,360 filed Mar. 10, 2016, U.S. Provisional Application Ser. No. 62/345,624, filed 3 Jun. 2016, and is a Continuation-In-Part of U.S. patent application Ser. No. 15/454,668 filed Mar. 9, 2017, the entire contents of each of which are hereby incorporated by reference.

THE NAMES OF THE PARTIES TO A JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are CABLE TELEVISION LABORATORIES, INC. and CISCO SYSTEMS, INC.

BACKGROUND

The field of the disclosure relates generally to small cell communication networks, and more particularly, to small cell communication networks implemented with a backhaul networks capable of proving cross network coordination.

Mobile Network Operators (MNOs) provide wireless service to a variety of user equipment (UEs), and operate using a variety of techniques such as those found in 3G, 4G LTE networks. The wireless service network can consist of macro and/or small cells.

Some MNOs operate with Multi System Operators (MSOs) within the cable industry for backhauling traffic for wireless networks. The MSO packages the communications between UE's and an associated MNO via the MSOs protocol, for example Data Over Cable Service Interface Specification (DOCSIS) or the like.

Since the wireless and backhaul networks are controlled by separate entities, DOCSIS backhaul networks and wireless radio networks each lack visibility into the other's network operations and data. This causes session step-up and scheduling algorithms for the wireless and DOCSIS network to operate separately, which can result in time consuming serial operations during the session set-up process and the transfer of data from UE to the mobile core. The DOCSIS network does not have visibility into session data, prioritization, and the amount of wireless data being backhauled, since this data is only known to the wireless portion of the network.

SUMMARY OF THE INVENTION

Systems and methods presented herein provide for expediting the setup of a wireless service through a request-grant based communication link, for example, a DOCSIS communication link. In one embodiment, a method comprises intercepting setup information for a wireless session from a mobile core (e.g., operated by an MNO) servicing the UE, initiating a communication session between a Modem Termination System (MTS) and a modem based on the intercepted setup information to support a forthcoming wireless session, and providing the wireless session through the communication session setup.

Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In an embodiment, the UE is an LTE wireless device, although it will be understood that the present invention is equally applicable for use with 2G, 3G, 5G, Wi-Fi and other wireless protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

In an embodiment, the present network controlled dynamic small cell management system includes a Centralized Unit formed with a Packet Data Convergence Protocol unit (PDCP) and a Radio Resource Controller (RRC). The system also includes a distributed unit formed with a Modem Termination System (MTS) including at least a Physical Layer (PHY) and a Media Access Control layer (MAC), and a virtualized Long Term Evolution Media Access Controller (v-LTE MAC) in close communication with the MTS and in communication with the PDCP and the RRC. The present system further includes at least one Remote Radio Unit (RRU) including a modem in communication with the MTS, and a Long Term Evolution Physical Layer unit (LTE PHY) in communication with the modem and being LTE wirelessly capable. The v-LTE MAC in formed with a scheduler for scheduling LTE traffic and the MTS includes a scheduler for scheduling LTE and non-LTE traffic.

BRIEF DESCRIPTION OF THE INVENTION

Some embodiments of the present invention are now described, by way of example only, and with reference to the accompanying drawings. The same reference number represents the same element or the same type of element on all drawings.

Figure 1:
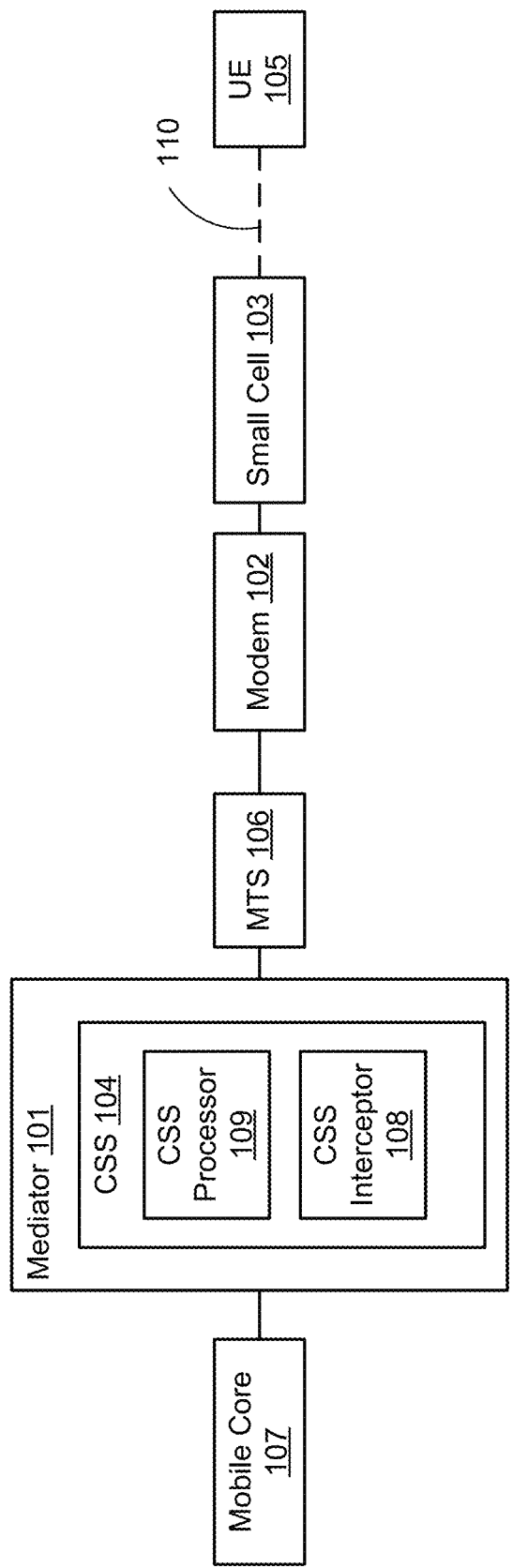
FIG. 1 is a block diagram of an exemplary wireless service link through an MTS.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE FIGURES

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. For example, the following description is discussed as applied to an LTE-DOCSIS cooperative network for expediting the setup of a wireless service through a request-grant based communication link between a user device and a wireless core. It will be appreciated that the present latency reduction in the wireless service system and method may equally be applied in systems utilizing macrocells, Wi-Fi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission.

FIG. 1 is a block diagram of an exemplary wireless service link. The wireless service link may include a mediator 101 in communication with an MTS 106. It will be understood that mediator 101 may be integrated with or communicatively coupled with MTS 106. The MTS 106 may be, for example, a CMTS, a Fiber Node, a Fiber Hub, an optical network unit (ONU), or other termination device. Mediator 101 may be implemented, for example, as a software agent in any of such devices. If mediator 101 is integrated with an MTS, integration may be via software or hardware.

A UE 105 may wirelessly communicate with other UEs (not shown) in a wireless service network for the purpose of transmitting and/or receiving data. A mobile core 107 (e.g., operated by an MNO) controls the operations of the UE 105 within the wireless network. This includes, among other things, managing subscription information (e.g., data communication, data plans, roaming, international calling, etc.) and ensuring that the UE 105 can initiate or receive data sessions and transmit data within the wireless network.

Mediator 101 is implemented with a Communication Session System (CSS) 104 having a CSS interceptor 108 and a CSS processor. Mediator 101, via CSS 104, is operable to intercept and process messages, such as but not limited to LTE messages, between UE 105 and mobile core 107. CSS interceptor 108 is operable to intercept a request for a wireless session between UE 105 and the mobile core 107 servicing UE 105. In an embodiment, CSS processor 109 processes CSS interceptor 108 intercepted setup information from the mobile core 107, which is generated in response to the request. Based on the intercepted setup information CSS processor 109 initiates a backhaul communication session (also called a "communication session" herein) between the modem 102 and the MTS 106 to deliver the wireless session through the communication session. CSS processor 109 initiates the communication session prior to, during, or close it time to when the wireless session is set-up such that the set-up process time, that of both the communication session and the wireless session, is reduced. In one embodiment, the set-up of the backhaul communication session and the wireless session occur at least partially in parallel, thereby reducing the set-up process time.

The CSS 104 may process the intercepted message and generate or otherwise provide data to MTS 106 such that MTS 106 may establish a communication session and a Quality of Service for the communication session between itself and the modem 102. This may be done prior to, in parallel to, or close in time to the establishment of a wireless session by the mobile core 107 with UE 105, see below for more details. One or more of the components of the mediator 101 and CSS 104 may be integrated or in communication with the MTS 106 via hardware, software, or combinations thereof.

In the past, MNOs often maintained, operated, and controlled wireless base stations themselves for the purposes of providing communications with UEs. For example, an MNO employing LTE communications may operate a plurality of eNodeBs in an area to provide wireless services to subscribing UEs in that area.

Now operators are capable of acting as backhaul operators. For example, MSOs are seeking to increase their value to the MNOs by providing alternative backhaul paths for communication between UEs, such as UE 105, and the mobile core, such as mobile core 107. MSOs and wireless operators currently employ wireless devices, a non-limiting example of which is small cell 103, for capturing a wireless data transmission and passing it through a backhaul system, such as that shown in FIG. 1. In the embodiment of FIG. 1, the backhaul system includes modem 102, MTS 106, and optionally meditator 101. The small cell 103 comprises many of the features of a larger base station such as the air-to-air interface and protocol handling. In some instances, the small cell 103 may be a multi-radio hotspot providing for Wi-Fi, as well as LTE Licensed Assisted Access (LTE-LAA) or LTE Unlicensed (LTE-U).

In an alternative embodiment communication is Wi-Fi communication and is between a STA (not shown) a Wi-Fi core (not shown). To modify the system of FIG. 1 to accommodate the Wi-Fi embodiment the skilled artisan would replace small cell 103 with a Wi-Fi station (STA) and the mobile core 107 with a Wi-Fi core.

Small cells and similar wireless technologies (collectively discussed and represented herein as small cells) represent new opportunities for MNOs. These new small cells allow operators to use existing spectrum more efficiently, and promote greater deployment flexibility, all at a lower cost. Small cells also reduce radio access network build-out while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from the modem 102. The MNOs, on the other hand, may employ a variety of wireless protocols including EDGE (Enhanced Data rates for GSM Evolution), 2G, 3G, 4G, 5G, LTE, or the like. While the MTS 106 and the modem 102 may be able to transport the wireless service traffic of the UE 105 and the mobile core 107, the MTS 106 and the modem 102 need not process the data transmitted. Rather, the MTS 106 and the modem 102 may simply route the traffic between the appropriate parties. In the example of FIG. 1, traffic is routed between UE 105 and mobile core 107 via small cell 103, modem 102, and MTS 106.

When a UE or a mobile core wants to establish a communication session with the other, the UE, small cell and mobile core exchange data sessions establishment with control signaling that includes QoS parameters. The QoS parameters describe a service quality for the data transmitted over the impending wireless session. To transport the wireless traffic of the UE 105 and the mobile core 107, the MTS 106 and the modem 102 need to establish a communication session that allows a wireless session between the UE 105 and the mobile core 107 to occur. To ensure Quality of Experience (QoE) for the end user that consume the wireless session, the backhaul link between the MTS 106 and the modem 102 should have matching or similar QoS provisions as the QoS requirements exchanged between the UE 105 and mobile core 107.

However, the QoS information contained in the LTE signaling is unknown by the backhaul system. Since the MTS 106 and the modem 102 are unaware of the underlying wireless traffic, the MTS 106 and the modem 102 do not know when a wireless session is being established. So, the MTS 106 and the modem 102 cannot understand what types of Quality of Service (QoS) need to be employed. For example, in LTE, the mobile core 107 may need to establish QoS parameters for the UE 105 based on the subscription information of the UE 105 and the type of media being requested by the application in use by the UE 105. LTE identifies QoS with a QoS Class Identifier (QCI), and can employ traffic prioritization such as Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, or some combination thereof.

This lack of insight by the backhaul system into the wireless session setup process and the associated QoS requirement for the session, affects the ability of the backhaul system to provide adequate QoS on the communication link between the modem 102 and the MTS 106. In case of high priority high bandwidth applications such as live video streaming, the MTS 106 is not aware of the QoS requirements needed to transport the data between itself and the modem 102. Thus, some blocks of data may be delayed such that they may no longer be relevant to the video and are therefore dropped. When this occurs regularly, the quality of a live streaming video and the user's quality of experience (QoE) are degraded significantly.

Now, even if the MTS 106 becomes aware of the QoS requirement for the session requested by either the UE 105, or the mobile core 107, the time it takes to set up adequate QoS provisions between the MTS 106 and the modem 102 adds latency to the existing wireless session setup process. Consequently, the end user's wireless session start time is delayed due to the serial setup processes (e.g., due to serial setup procedure of LTE and DOCSIS sessions), and the user's QoE is still affected.

The present embodiments provide for the backhaul QoS signaling (e.g., via a DOCSIS protocol) to be completed in parallel with the wireless session establishment (e.g., LTE wireless session establishment). The present embodiments therefore enable the backhaul system to become aware of the QoS requirement for the wireless traffic such that they provide for the provisioning of the wireless session(s) accordingly, as well as enables the provisioning process to occur without added latency.

In this embodiment, the MTS 106 is configured to identify the various aspects of the wireless session. For example, the MTS 106 may include a mediator 101 comprising functionality of a gateway. In this regard, the MTS 106 can intercept a request from the UE 105 (e.g., via the CSS 104) that indicates whether the UE 105 needs to establish a session to transfer data to the mobile core 107. This may direct the MTS 106 to initiate the establishment of a communication session between the MTS 106 and the modem 102.

Alternatively or additionally, the MTS 106 may be configured with functionality of the mobile core 107 to decode and interpret LTE messages. For example, in a DOCSIS protocol embodiment, the MTS 106 is a CMTS, and may include functionality of an LTE gateway that is operable to intercept a session establishment request from the UE 105 indicating that it needs to start a wireless session to the mobile core 107. This may direct the MTS 106 to initiate the establishment of a communication session between the MTS 106 and the modem 102.

The MTS 106, mediator 101, and/or CSS 104 may also intercept a response to the request from the mobile core 107 (e.g., via mediator 101 or CSS 104). For example, when the mobile core 107 receives a request from the UE 105, the mobile core 107 establishes the requested wireless session between the mobile core 107 and the UE 105. This may include establishing the parameters of the QoS for the wireless session. The MTS 106 may intercept this information and initiate the setup of the communication session between the MTS 106 and the modem 102 using those QoS parameters for the wireless session to ensure that the user of the UE 105 has an acceptable QoE. The MTS 106 and the modem 102 work together to ensure that the QoS of the transport properly matches or supports the QoS of the wireless session. The MTS 106 and the modem 102 do so without unnecessarily consuming or reserving too many network resources. The operator determines how the QoS mechanism is applied to support the QoS Class Identifiers (QCIs), and configures these policy rules into the gateway, allowing the operator to optimize resources for QoS on their network.

Alternatively or additionally, the mobile core 107 may communicate out of band signaling (OOB) indicating that a wireless session between the mobile core 107 and the UE 105 is to be established. The MTS 106, mediator 101, and/or CSS 104 are operable to detect that signaling and initiate or participate in the establishment of a communication session between the MTS 106 and modem 102 to accommodate the wireless session.

Because the MTS 106, mediator 101, and/or CSS 104 intercepts the wireless session set-up data during the initiation of the wireless session, the communication session with the needed QoS can be established in parallel or at least partially in parallel to the wireless session rather than in series. For example, some operators may use DOCSIS network for backhauling traffic of the mobile core 107. DOCSIS and radio networks, such as LTE, have separate scheduling algorithms that result in longer communication latencies. That is, a radio network schedules traffic from the UE 105 differently than an MTS, such as an CMTS, schedules traffic from the modem 102. This often results in the mobile core 107 needing to wait until the DOCSIS network completes a session establishment before the proper QoS session establishment can be completed. These embodiments overcome that by allowing the MTS 106 to establish the communication session with the modem 102 substantially in parallel with the mobile core 107 establishing the wireless session with the UE 105.

Based on the foregoing, the UE 105 is any device, system, software, or combination thereof operable to communicate wirelessly with a wireless network using any one or more wireless protocols including, 2G, 3G, 4G, 5G, LTE, LTE-U, LTE-LAA, or the like, as well as with a Wi-Fi network using any one or more wireless service protocols including 802.11ax. Examples of the UE 105 include, but are not limited to, laptop computers, tablet computers, and wireless telephones such as smart phones. The small cell 103 is any device, system, software, or combination thereof operable to provide an air-to-air interface 110 for the mobile core 107, one example of which is a Wi-Fi core. Examples of the small cell 103 include Wi-Fi access points and base stations operating as eNodeBs in a wireless network. The modem 102 is any device, system, software, or combination thereof operable to provide data transfers with an MTS. Examples of the modem 102 include DOCSIS enabled set-top boxes, an Optical Network Unit or fiber optic modem, and a satellite modem. The MTS 106 is any device, system, software, or combination thereof operable to communicate with the modem 102 as well as provide a wireless service session through the communication link provided by the modem 102 and the MTS 106.

Again, the CSS 104 and its components may implement the functionality for establishing the communication session setup stated herein. The CSS 104 may be any device, system, software, or combination thereof operable with or in the mediator 101 and/or the MTS 106 to implement said functionality. Other exemplary embodiments are shown and described below.

Figure 2:
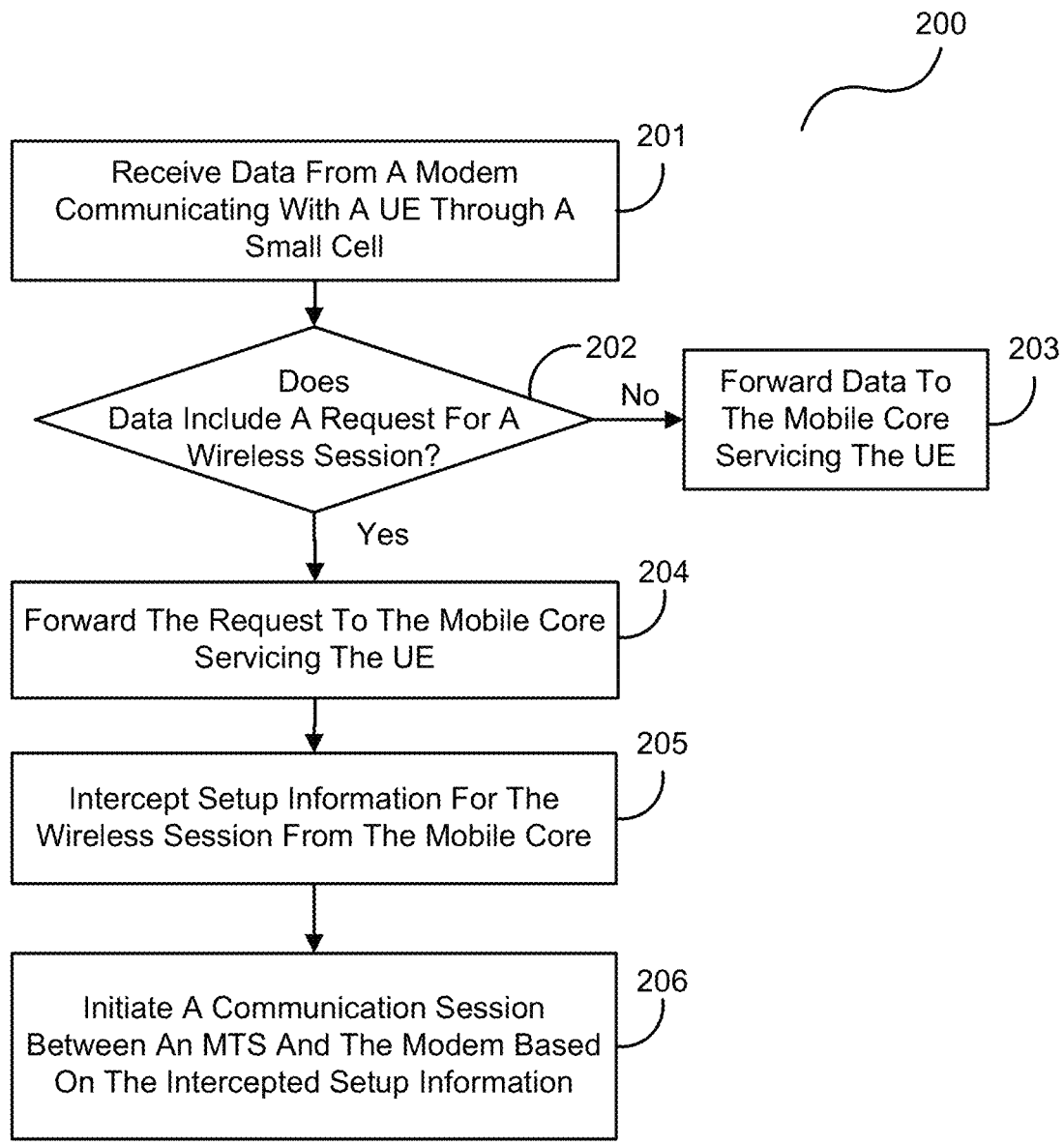
FIG. 2 is a flowchart illustrating an exemplary process operable with the MTS of FIG. 1.

FIG. 2 is a flowchart illustrating an exemplary process 200 operable with the MTS 106 of FIG. 1. In this embodiment, the small cell 103 communicates with the UE 105 over the air-to-air interface 110 and forwards any UE data to the modem 102. The modem 102 may forward the data to the MTS 106. The CSS 104 receives the data, in the process element 201, and determines whether the data includes a request for a wireless session, in the process element 202. For example, the CSS 104 may evaluate all or a portion of the data from the UE 105 and determine whether the UE 105 is transmitting a request to the mobile core 107 such that the mobile core 107 can establish a wireless session with UE 105. Optionally mediator 101, which in is communication with MTS 106, determines whether the data includes a request for a wireless session.

If it is determined in process element 202, the data from the UE 105 does not contain such a request, the CSS 104 simply forwards the data to the mobile core 107 servicing the UE 105, in the process element 203, and process 200 ends. If it is determined in process element 202, the data from the UE 105 does include a request to establish a wireless session, then the CSS 104 forwards, or is optionally instructed by the mediator 101 to forward, the request to the mobile core 107, in the process element 204. In an embodiment, the CSS 104 may inspect traffic from the mobile core 107 intended for the UE 105. In this regard, the CSS 104 may intercept setup information for wireless session from the mobile core 107, in the process element 205.

The CSS 104 propagates the setup information to the modem 102 such that it may forward the setup information to the small cell 103 and to the UE 105 over the air-to air-interface 110. This allows the mobile core 107 to setup a wireless session with the UE 105. As the CSS 104 has determined that the mobile core 107 is setting up the wireless session with UE 105, the CSS 104 initiates a communication session between the MTS 106 and the modem 102 based on the intercepted setup information, in the process element 206. Thus, the MTS 106 sets up its communication session with the modem 102 while the mobile core 107 is setting up its wireless session with the UE 105, thereby reducing latencies associated with the differences between the wireless and wireline protocols.

Figure 3:
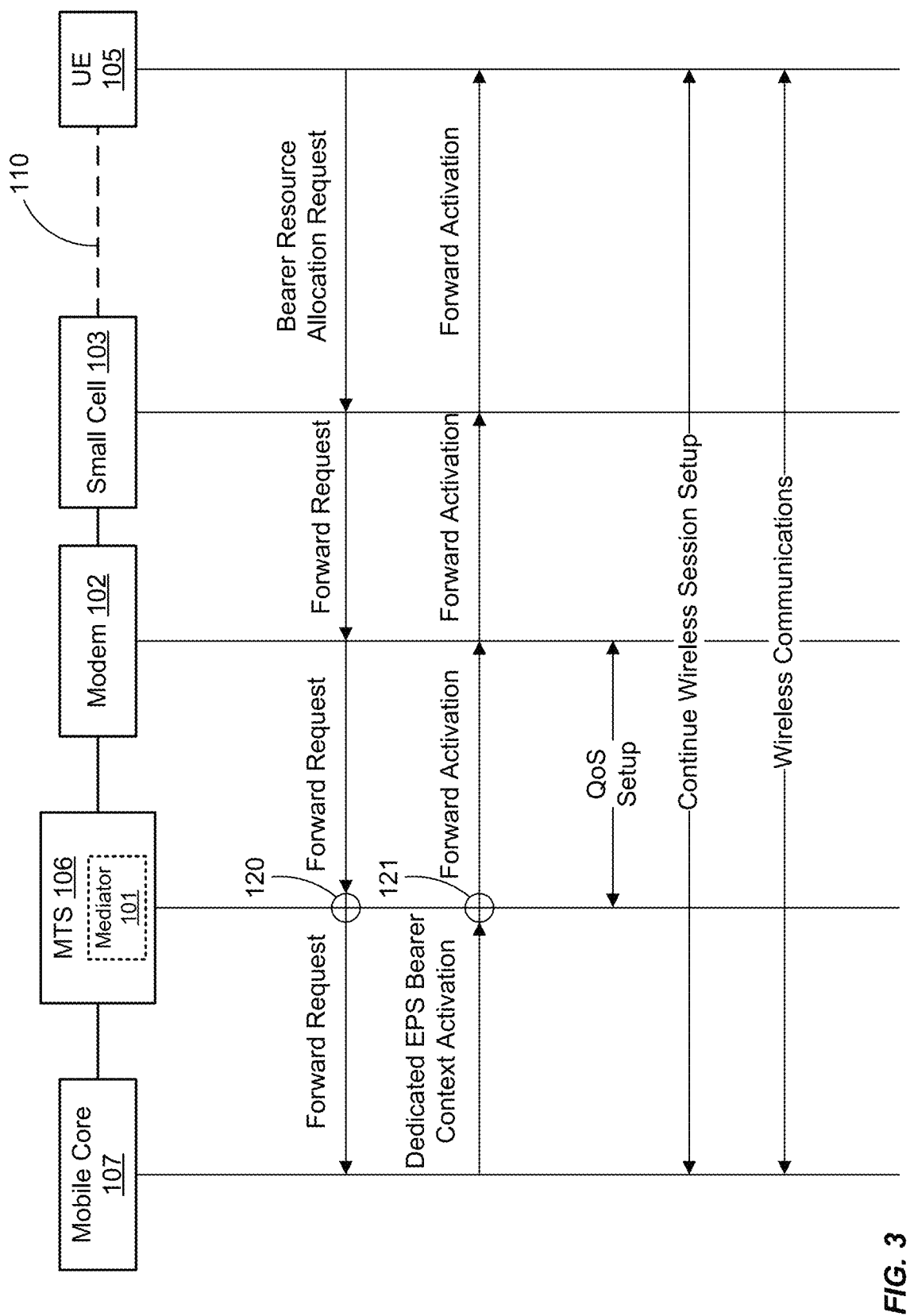
FIG. 3 is an exemplary communication diagram of the wireless service link of FIG. 1.

FIG. 3 is an exemplary communication diagram of the wireless service link of FIG. 1. In this embodiment, the small cell 103 communicates with the UE 105 over the air-to-air interface 110 via a wireless protocol. Thus, when the UE 105 communicates with the mobile core 107, the UE 105 communicates via the wireless protocol.

When the UE 105 launches an application, the application may request a new wireless session through the mobile core 107. Accordingly, the UE 105 transfers a bearer resource allocation request to the mobile core 107 via the small cell 103. The small cell 103 forwards the request to the modem 102. The modem 102 forwards the request onto the MTS 106 over the communication link. The MTS 106 or an associated mediator 101 (e.g., via the functionality of the CSS 104) may intercept the request (element 120) and recognize it as a bearer resource allocation request from the UE 105. This would allow the MTS 106 or the associated mediator 101, independently or cooperatively, to prepare for a response from the mobile core 107 indicating that is about to establish a wireless session with the UE 105.

The MTS 106 or the associated mediator 101 (e.g., via the functionality of the CSS 104), independently or cooperatively, forwards the request to the mobile core 107 and waits for the associated response. When the mobile core 107 transfers a dedicated bearer context activation (e.g., a Evolved Packet System (EPS) bearer context activation), the MTS 106 intercepts that activation message (element 121) and processes all or a portion of the message to access to determine that the mobile core 107 is establishing a wireless session with the UE 105. Accordingly, the MTS 106 extracts activation message data, such as but not limited to the QoS parameters, from the activation message. The MTS 106 does this to establish, for example, the same or compatible QoS parameters with the communication session between the MTS 106 and the modem 102. Then, the MTS 106 establishes a communication session between the MTS 106 and the modem 102 (e.g., via a DOCSIS Dynamic Service Flow (DSx) message), as well as forwards the activation message to the small cell 103, which in turn forwards it to the UE 105. Thus, the MTS 106 establishes the setup of communication session after or substantially at the same time the wireless session is finalized. Once the wireless session is established, wireless communications can commence between the UE 105 and the mobile core 107 because the communication session between the MTS 106 and the modem 102 has already been established.

Figure 4:
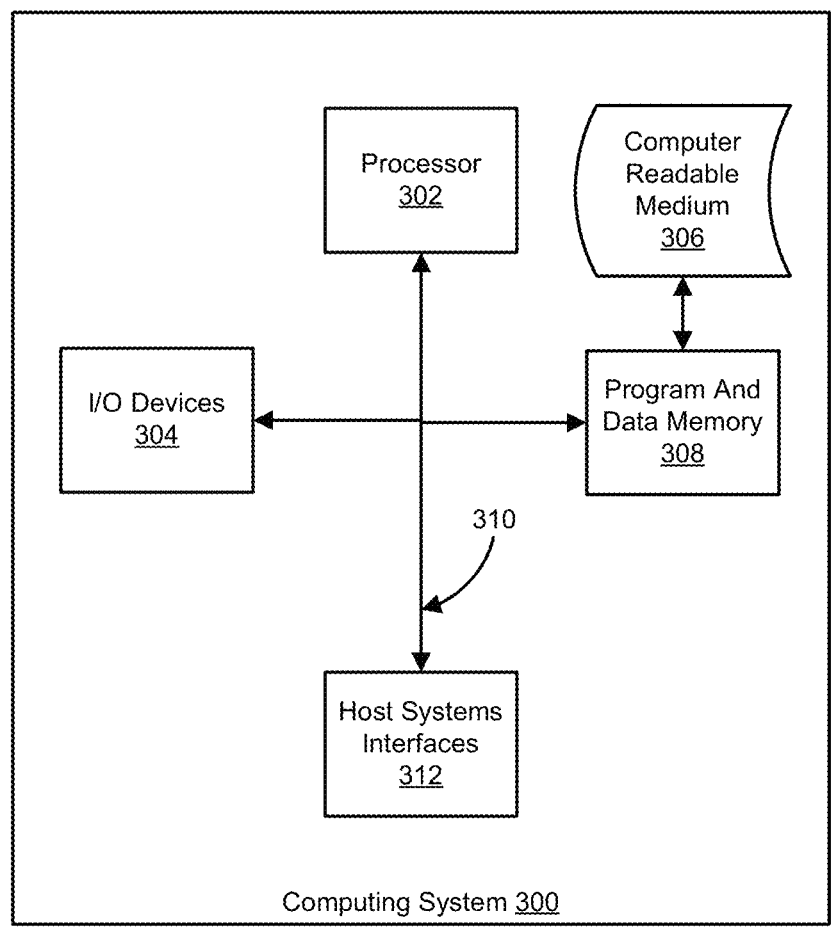
FIG. 4 is a block diagram of an exemplary computing system in which a computer readable medium provides instructions for performing methods herein.

The invention can take the form of an entirely hardware embodiment, an entirely software embodiment or an embodiment containing both hardware and software elements. Embodiments utilizing network functions virtualization (NFV) and virtualized hardware, such as a virtualized MTS, modem, etc., are also contemplated. In one embodiment, the invention is implemented in whole or in part in software, which includes but is not limited to firmware, resident software, microcode, etc. FIG. 4 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk—read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems and Ethernet cards are just a few of the currently available types of network adapters.

Figure 5:
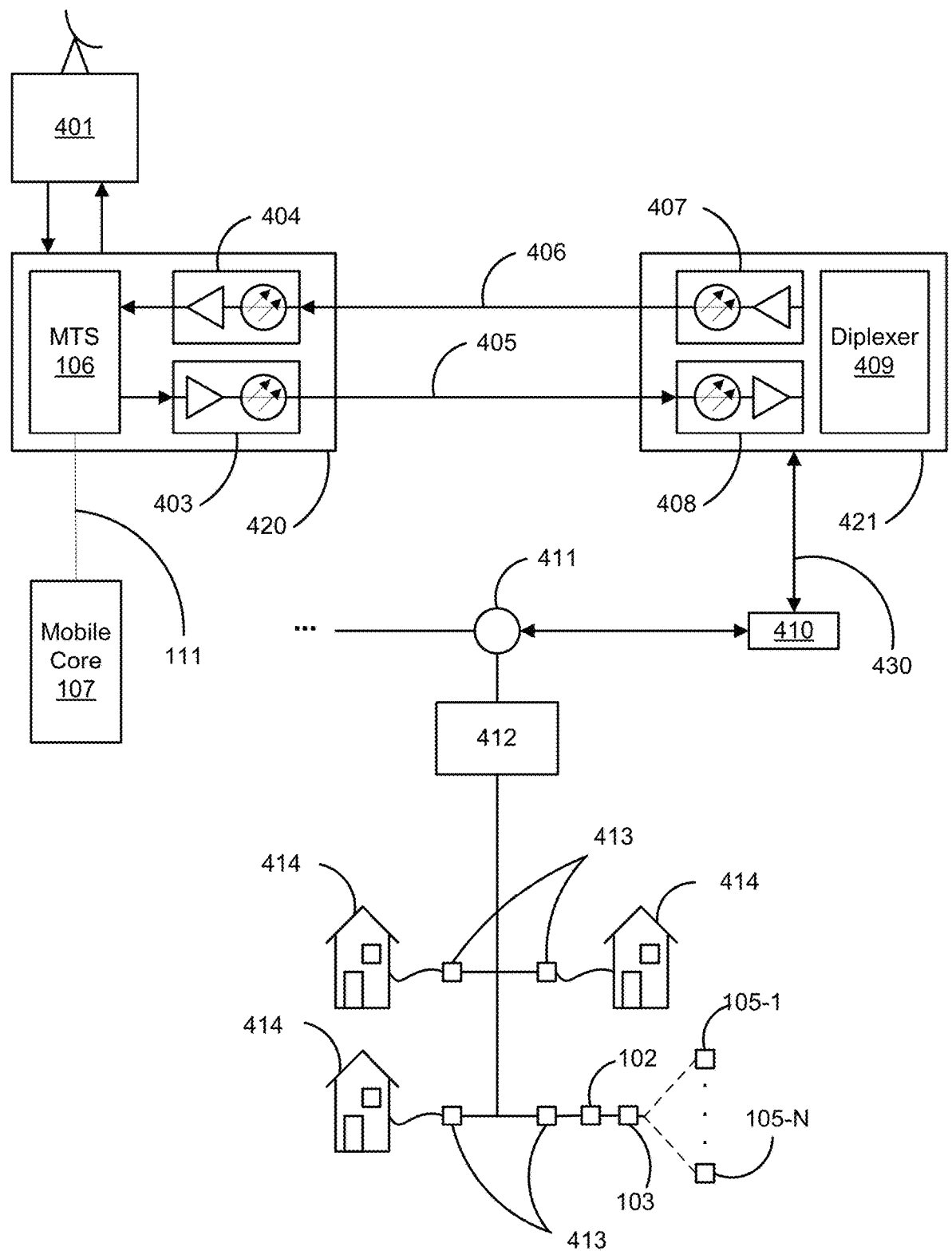
FIG. 5 is a block diagram of a communication system operable to implement the embodiments herein.

FIG. 5 is a block diagram of an exemplary system operable to provide wireless service for a plurality of UEs 105-1-105-N (where "N" is simply intended to represent an integer greater than "1" and not necessarily equal to any other "N" reference designated herein). For example, upstream and downstream links of the exemplary communication system offers high speed data services over connected devices, such as the modem 102. The modem 102 may be configured with or receive communications from the small cell 103 so as to allow the UEs 105 to communicate through the communication system in a manner that is transparent to the user.

The communication system includes a communication component 401 configured with an upstream hub 420. The hub 420 is coupled to a fiber node 421 via optical communication links 405 and 406. The hub 420 includes an MTS 106, an electrical to optical converter 403, and an optical to electrical converter 404. The node 421 is similarly configured with an optical to electrical converter 408 and an electrical to optical converter 407.

The communication component 401 is the source for various communication signals. Antennas may receive communication signals that are converted as necessary and transmitted over fiber optic cables 405 to the hub 420. Several hubs may be connected to a single communication component 401 and the hub 420 may each be connected to several nodes 421 by fiber optic cable links 405 and 406. The MTS 106 may be configured in the communication component 401 or in the hub 420.

Downstream, such as in homes/businesses, are devices that operate as data terminals. These data terminals are modems. A modem can acts as a host for an Internet Protocol (IP) device such as personal computer. However, the modem can be configured with a small cell so as to provide wireless services through the system for the UEs 105-1-105-N.

In this embodiment, transmissions from the MTS 106 to the modem 102 are carried over the downstream portion of the communication system generally in the band between 54 MHz and 3 GHz, for example. Downstream digital transmissions are continuous and are typically monitored by many modems. Upstream transmissions from the modems to the MTS 106 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that modems 102 and the MTS 106 engage in full duplex transmission modes, whereby concurrent transmissions on the upstream and the downstream over the same frequency is supported. Equivalent communications and protocols for fiber optic transmissions are also contemplated, for example, using an optical network terminal (ONT) or optical line termination (OLT), and an optical network unit (ONU), and equivalent protocols such as EPON, RFOG, or GPON.

The MTS 106 connects the system to the Internet backbone. The MTS 106 connects to the downstream path through an electrical to optical converter 404 that is connected to the fiber optic cable 406, which in turn, is connected to an optical to electrical converter 408 at the node 421. The signal is transmitted to a diplexer 409 that combines the upstream and downstream signals onto a single cable. The diplexer 409 allows the different frequency bands to be combined onto the same cable.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/TDMA) scheme, or Orthogonal Frequency Division Multiple Access (OFDMA). The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420. The fiber optic links 405 and 406 are typically driven by laser diodes, such as Fabry Perot and distributed feedback laser diodes.

Figure 6:
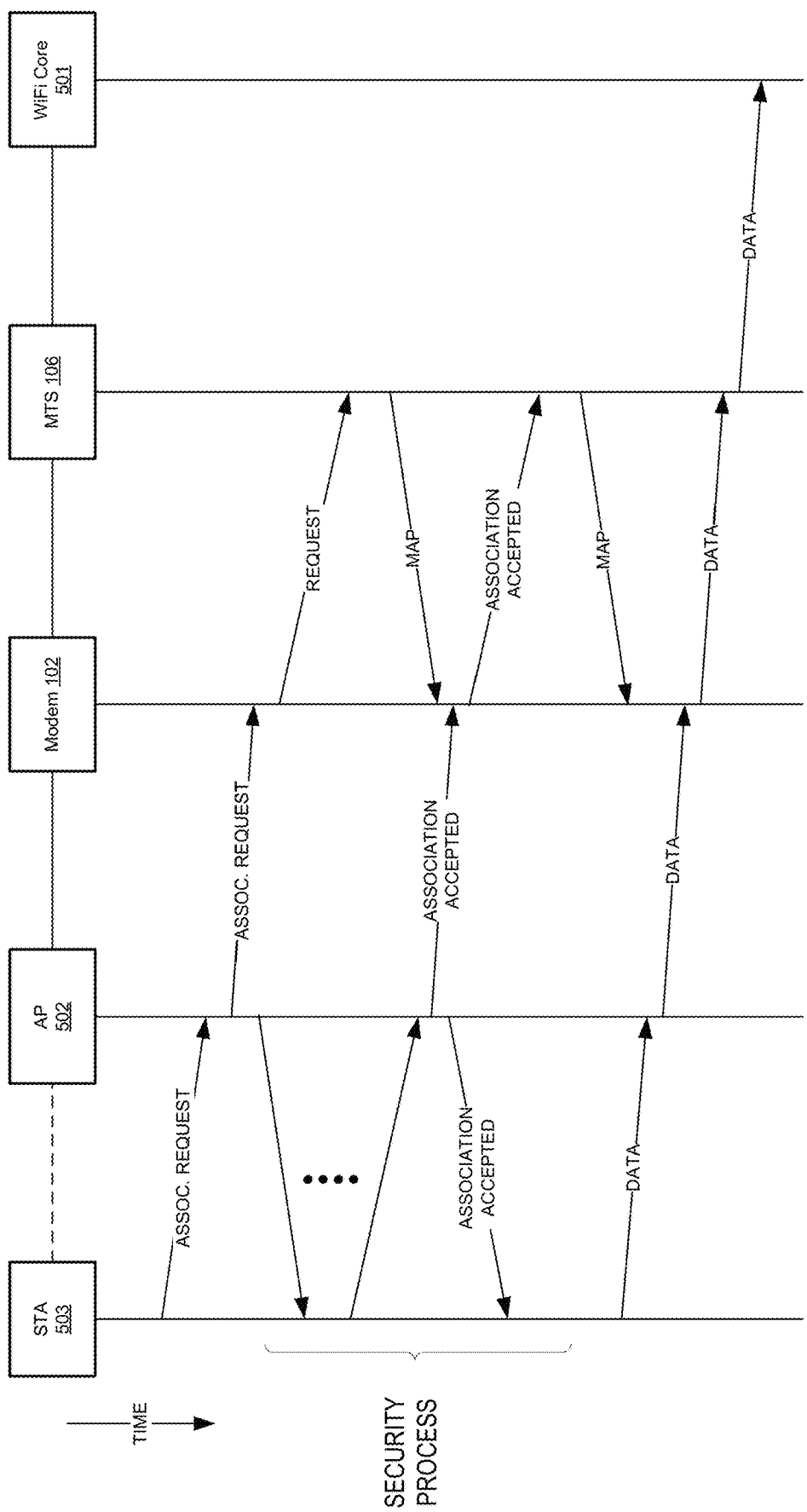
FIG. 6 is an exemplary communication diagram of the wireless service link employing Wi-Fi.

FIG. 6 is an exemplary communication diagram of the wireless service link employing Wi-Fi. In FIG. 6, the communication diagram is illustrated as part of a Wi-Fi association setup. In this regard, the communication link established between the modem 102 and the MTS 106 interfaces with a Wi-Fi core 501 as well as an access point (AP) 502 (e.g., wireless access point or "WAP"). The AP 502 communicates with a Wi-Fi station (STA) 503 such that the STA 503 can transmit data to the Wi-Fi core 501.

When the STA 503 needs to transmit data to the Wi-Fi core 501, the STA 503 issues an "association request" to the AP 502. The AP 502 transfers the association request to the modem 102 which, in turn, issues a request to the MTS 106 to transfer data. The MTS 106 transfers a MAP (or some other granting mechanism) to the modem 102 granting the modem 102 a data transfer. At or about the same time, the AP 502 communicates with the STA 503 as part of a security process until the AP 502 accepts the association with the STA 503.

When the AP 502 accepts the association with the STA 503, the AP 502 forwards the accepted association to the modem 102 such that it may transfer the accepted association to the MTS 106. The MTS 106 transfers a MAP (or some other granting mechanism) to the modem 102 such that it can prepare for the data from the STA 503. And, when the STA 503 receives the accepted association from the AP 502, the STA 503 begins to transfer its data. As the communication link between the modem 102 and the MTS 106 has already been established, the AP 502 can simply transfer the data to the Wi-Fi core 501 through the granted communication link between the modem 102 and the MTS 106.

Figure 7:
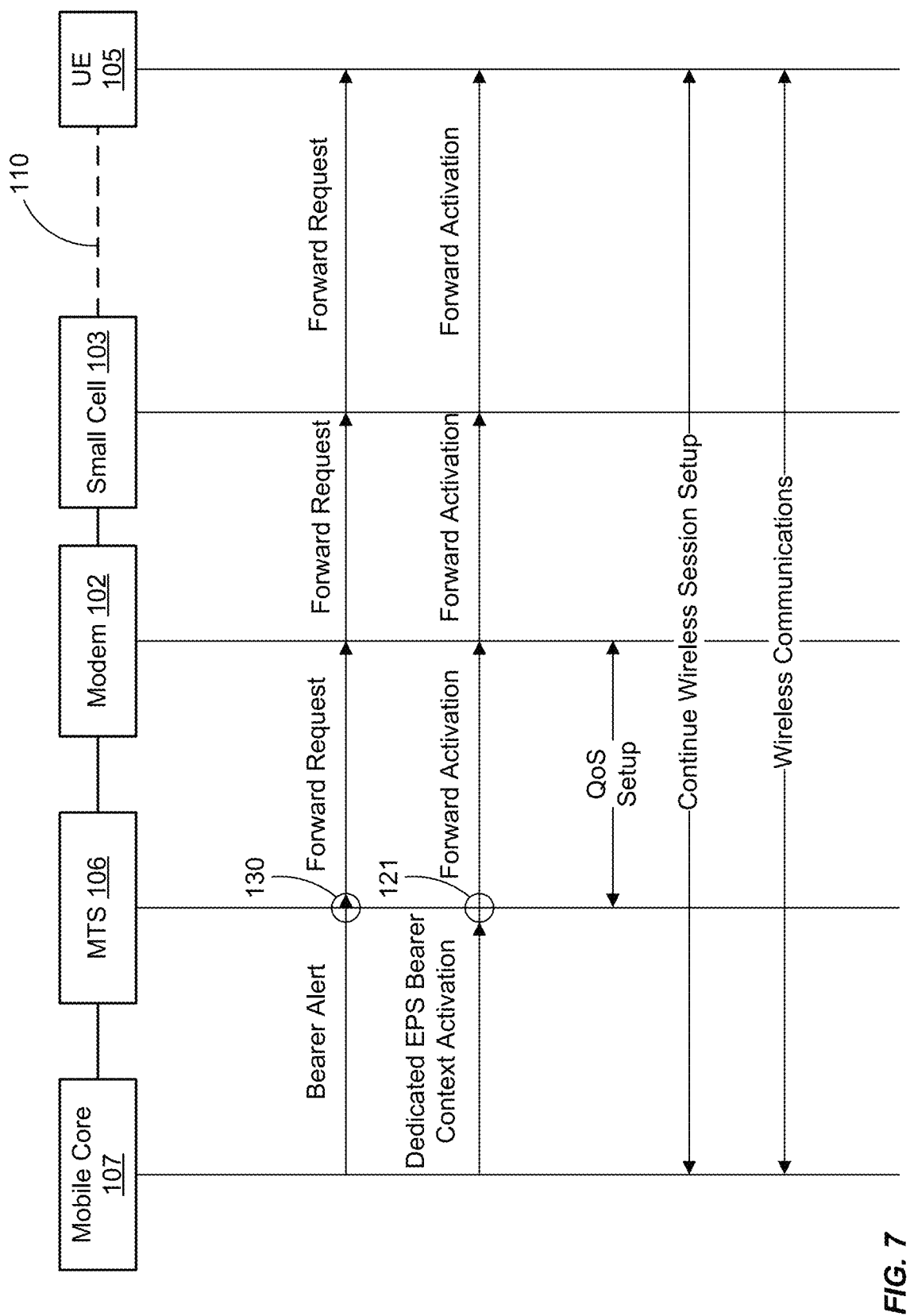
FIG. 7 is an exemplary communication diagram of the wireless service link of FIG. 1 illustrating a network initiated session.

FIG. 7 is an exemplary communication diagram of the wireless service link of FIG. 1 illustrating a network initiated session. In this embodiment, the mobile core 107 transfers a bearer alert to the MTS 106. The MTS 106 may intercept the alert (element 130) and recognize it as a network initiated bearer alert for the UE 105. This would allow the MTS 106 to prepare to respond to the impending wireless session establishment by preparing to set up a communication session on between the MTS 106 and the modem 102. The MTS 106 then transfers the alert to the UE 105 through the modem 102 and the small cell 103. Again, the small cell 103 communicates with the UE 105 over the air-to-air interface 110 via a wireless protocol. Thus, when the UE 105 communicates with the mobile core 107, the UE 105 communicates via the wireless protocol. From there, the mobile core 107 transfers a dedicated bearer context activation (e.g., a Evolved Packet System (EPS) bearer context activation), the MTS 106 intercepts that activation message (element 121) and understands that the mobile core 107 is establishing a wireless session with the UE 105, and in turn, initiates a session setup on the communication link (e.g., via DSx for DOCSIS). The communications continue as with that shown and described in FIG. 3.

Previous small cell work was limited to control over small cell coverage area based on each individual small cell's triggers and metrics, such that each small cell (also called herein, "eNodeB" and "eNB") determines its own triggers for coverage area growth or shrinkage, e.g., capacity and power related triggers. This is a cumbersome process having competing interests and decision criteria due to limited or the complete lack of small cell-to-small cell communication. The output of the process can also be suboptimal, e.g., coverage holes could be created due to multiple small cells deciding to shrink their coverage area. The present system and method for network controlled dynamic small cell management overcomes this and other problems that exist in the prior art.

In small cell deployments, small cells are operable to resize and/or reshape cell coverage areas depending on, for example, traffic demands, via transmit power adjustments and beam forming and coverage shaping. Areas of overlapping coverage, i.e., two or more cells, (small and/or macro cells) may be alternatively instructed or configured to transmit utilizing a time division multiplexing model (also called here "inter-small cell time division multiplexing"), such that only one cell is transmitting during a giving time frame. Furthermore, capacity or resources may be allocated to both small cell and non-small cell users and clients. Depending on the non-small cell clients that a modem supports, any non-small cell excess capacity and network resources may be allocated to small cell users. This may vary depending on client and customer requirements, QoS requirements, predictive modeling of use, etc. A Modem Termination System (MTS) or a small cell gateway that is integrated with an MTS may be configured to balance any remaining (or excess) capacity amongst the small cells modems by, for example, adjusting power levels for each small cell, thereby reducing or increasing the small cell's coverage area, shape, etc. Power adjustments in this way may also be utilized to reduce power consumption. Additionally, at low loading time of the day, an MTS or a small cell gateway integrated with an MTS may be configured to turn off one or more small cells while ensuring coverage continuity through other small cells and larger LTE macro cell base station. It will be understood that the MTS discussed herein is at least a MAC/PHY implemented MTS such that scheduling functionality exist within the MTS. That is, the MTS discussed herein may be a standard MTS, or may have virtualized aspects as long as the scheduling portion of the MAC layer is retained within the MTS.

In prior work, each eNB makes its own decisions based on its own requirements without heed for the interests of adjacent eNBs. We have found that small cell management is best done at the network level, which includes the mobile network and the back haul network. This provides dual network (wireless and backhaul) visibility into resources over a large coverage area having a plurality of small cells, and in some instances small cells and Wi-Fi access points (APs). That is, decisions are best handled at the network level or a unified or partially unified controller (hereinafter called collectively a "unified controller") to optimize resource allocation and management over a larger scale. A unified controller here means a single controller that replaces the plurality of controls located within an equal number of small cells and/or Wi-Fi devices, (see FIG. 8B). One example of plurality of controls is the MAC or MAC/RLC aspects of small cells/eNodeBs. The unified controller may be one of a virtualized LTE MAC/RLC and a virtualized MAC.

In a first special case, the unified controller is implemented within the MTS by virtualizing the LTE MAC or LTE MAC/RLC with the MTS such that LTE-MTS scheduling may be done cooperatively and close in time.

In a second special case, the unified controller is implemented within the MTS such that the LTE and MTS scheduler is a single combined or integrated scheduler. In such an embodiment the combined scheduler has access to all LTE and MTS data, which vastly reduces latency, reduces scheduling time, optimizes UE steering, facilitates session set-up with reduced time, etc. That is, the combined scheduler provides a more global view over the communication network, which provides great advantage to its users and clients in terms of latency, reduced retransmits, optimized scheduling, intelligent client steering, etc.

In an embodiment, one aspect of the unified controller is a virtualized and unified LTE MAC unit (also called herein a "network implemented LTE MAC," a "unified LTE MAC," a "virtual LTE MAC," etc.) which supports a plurality of remote LTE PHY devices located Remote Radio Units (RRU). In another embodiment, one aspect of the unified controller is a unified virtual LTE MAC/RLC layer (also called herein a "network implemented LTE MAC/RLC", a "unified LTE MAC/RLC", a "virtual LTE MAC/RLC", etc.) which supports a plurality of remote LTE PHY devices located Remote Radio Units (RRU). These ideas are best viewed in FIGS. 8a and 8B, below. By disaggregating the LTE functional layers, the plurality of small cell LTE MAC/RLCs (to facilitate understand, "LTE MAC," i.e., not implemented with the RLC, is generically called "LTE MAC/RLC") otherwise needed to manage the plurality of LTE PHY devices are formed as a single centralized/unified LTE MAC/RLC in the network. The LTE MAC/RLC may access all small cell data for at least the small cell/remote radio units (RRU) it supports. As such, the network implemented LTE MAC/RLC is best equipped to manage small cell conflicts, power utilization, coverage areas, traffic steering, UE steering, etc.

In a non-limiting cable network implementation, the present system and method may be important for cable operators that either have deployed small cells, or will be deploying small cell networks. Also, given small cells are a main focus of 5G wireless communication systems, this solution is not only important to cable operators, but any mixed operator who deploy fixed or wireless backhaul, front haul, x-haul, etc. and wireless networks.

Figure 8A:
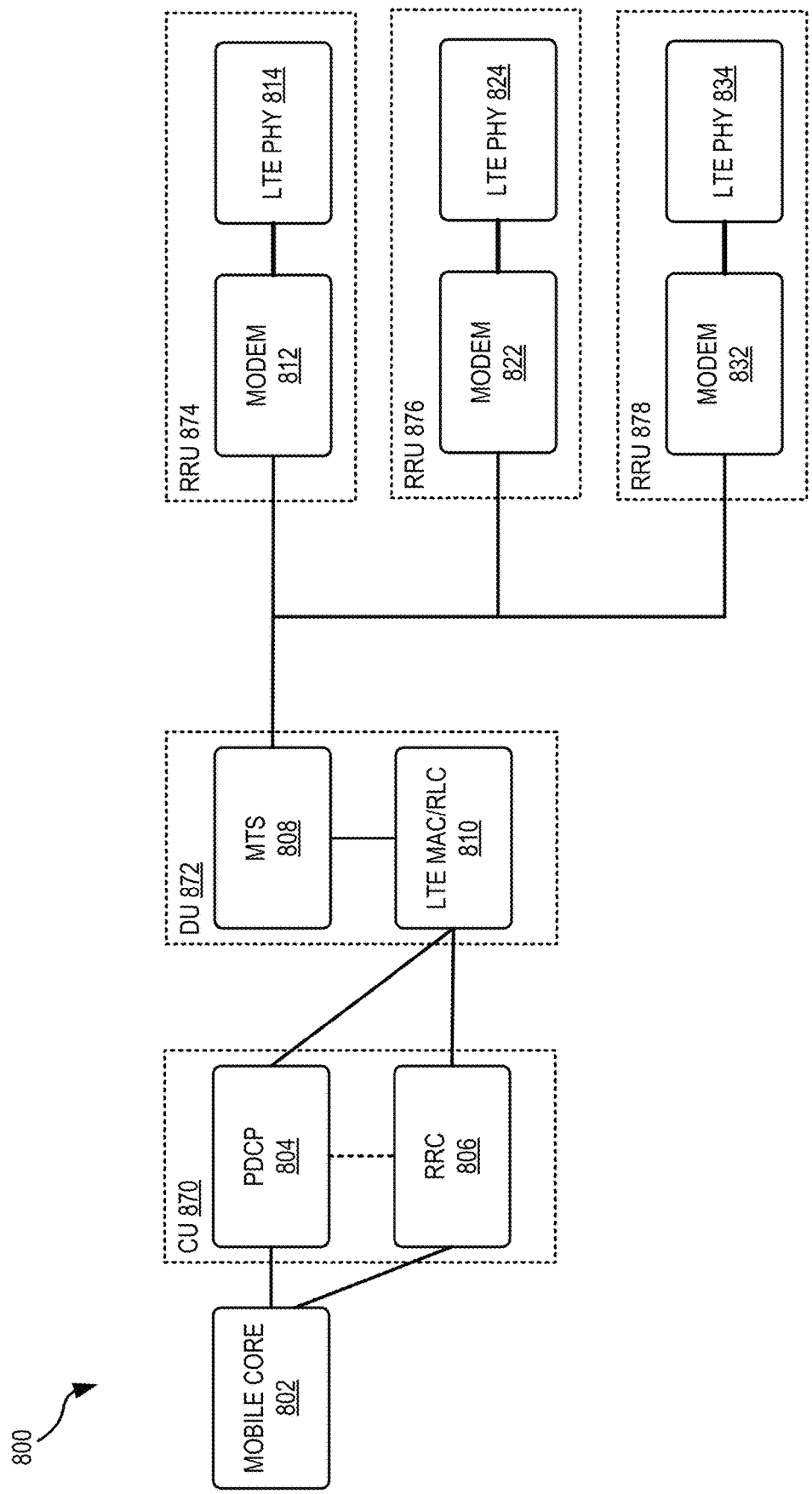
FIG. 8A shows one exemplary communication system in which the present network controlled dynamic small cell management system and method is implemented, in an embodiment.

FIG. 8A shows one exemplary communication system 800 in which the present system and method is implemented.

System 800 includes a mobile core 802, a Centralized Unit (CU) 870 having a Packet Data Convergence Protocol unit (PDCP) 804 and a Radio Resource Controller (RRC) 806, a Distributed Unit (DU) 872 having a Modem Termination System (MTS) 808 and an Long Term Evolution Media Access Controller/Radio Link Controller (LTE MAC/RLC) 810, and three Remote Radio Units (RRUs) 874, 876, 878. RRU 874 includes a modem 812 in communication with an LTE PHY 814 device. RRU 876 includes a modem 822 in communication with an LTE PHY 824 device. RRU 878 includes a modem 832 in communication with an LTE PHY 834 device.

In the embodiment of FIG. 8A, mobile core 802 is symbolically represented as in communication with both PDCP 804 and RRC 806 of CU 870. Both PDCP 804 and RRC 806 are symbolically represented as in two way communication with each other and each in two way communication with LTE MAC/RLC 810 of DU 872. It will be understood that in a typical installation DU 872 is within 10-20 kilometers of a user device or UE (not shown). LTE MAC/RLC 810 is symbolically represented as in two way communication with MTS 808 within DU 808. MTS 808 is symbolically represented as in two way communication with modems 812, 822, 832 within RRU 874, 876, 878, respectively. It will be understood that in a typical installation RRUs 872-878 is within 2 kilometers or less of a user device or UE (not shown). Modems 812, 822, 832 are symbolically represented as in two way communication with LTE PHY 814, 824, 834, respectively. Each or LTE PHY 814, 824, 834 may be in two way communication with one or more user equipment (UEs), not shown for sake of simplicity and to ease of understanding.

A PDCP, represented by PDCP 804, is specified by 3GPP in TS 36.323 for LTE. PDCP 804 is shown in a centralized or virtualized configuration in system 800, being physically separated from RRUs 874-878. The PDCP is located in the Radio Protocol Stack in the LTE Air interface above of the RLC layer. As is known in the art, the following services are provided by PDCP to upper layers:
 transfer of user plane data;
 transfer of control plane data;
 header compression;
 ciphering; and
 integrity protection.

An RRC, represented as RRC 806, is a Radio Resource Controller as known in the art and also shown in a distributed or virtualized configuration in system 800, being remote from RRUs 874-878. RRU 806 Some of the major RRC protocol functions include connection establishment and release functions, broadcast of system information, radio bearer establishment, reconfiguration and release, RRC connection mobility procedures, paging notification, and release and outer loop power control. By means of the signaling functions the RRC configures the user and control planes according to the network status and allows for Radio Resource Management strategies to be implemented.

LTE MAC and RLC portions, represented in combination here as LTE MAC/RLC 810, performs the functions of standard LTE MAC and RLC, with the exception that LTE MAC/RLC 810 is not collocated with LTE PHY 814, 824, 834. That is, LTE MAC/RLC 810 is also shown in a distributed or virtualized configuration in system 800.

LTE MAC/RLC 810 may be distributed with the network, virtualized, or otherwise arranged in distributed LTE or LTE hybrid system. LTE MAC/RLC 810 may be formed as a singular unit with functionality to support a plurality of LTE PHY units, such as LTE PHY 814, 824, 834. In this way, LTE MAC/RLC 810 stores and has access to data associated with all LTE PHY 814, 824, 834. LTE MAC/RLC 810 can access, by way of example, all capacity data usage amongst the LTE PHY 814, 824, 834 on a per subframe basis. For example, LTE MAC/RLC 810 provides scheduling for multiple LTE RRUs 874-878 such that LTE MAC/RLC 810 can determine the capacity usage for all remote small cells (RRUs 874-878) on a per subframe basis. This provides LTE MAC/RLC granular detail for performing MAC and RLC functions and for coordinating with MTS 808 for improved and cooperative scheduling. By centralizing the MAC and RLC processes for a plurality of LTE PHY units 814, 824, 834 tasks such as scheduling, power management, coverage area control, UE hand-off between eNBs, session set-up, etc. are greatly improved. By locating LTE MAC/RLC 810 in close communication with MTS 808 latency is reduced, LTE-backhaul coordination is improved (including but not limited to scheduling, traffic and UE steering, power optimization, coverage area sizing and shaping, inter-small cell time division multiplexing (discussed above), LTE-backhaul data sharing through shared or combined data storage, etc.). In an alternative or the same embodiment, instead of utilizing the granular detail on a per sub-frame basis, LTE MAC/RLC 810 may determine an average over a plurality of sub-frames and report this to the MTS 808.

MTS Access BWR

In a separate embodiment, MTS 808 may derive capacity usage data on a per subframe bases by reading at least a portion of the Band Width Reports (BWR) sent from LTE MAC/RLC 810 to MTS 808. Such MTS reading of a BWR may utilize, for example, a mediator as disclosed and described in U.S. patent application Ser. No. 15/454,668, entitled "Systems and Methods for Expedited Session Setup of a Wireless Session," and filed Mar. 9, 2017 to which the present application is a CIP; and U.S. patent application Ser. No. 15/453,146, entitled, "Latency Reduction for Virtualized Small Cells," and filed Mar. 8, 2017, both of which are incorporated herein by reference. Alternatively, an agent may be used, such as that disclosed and described in U.S. patent application Ser. No. 15/236,147, entitled "Latency Reduction in Wireless Service," and filed Aug. 12, 2016, also incorporated herein be referenced. The mediator may be located with MTS 808 or may be situated between PSCP 804 and MTS 804. Alternatively, the mediator may be situated between the LTE MAC/RLC 810 and one or both of PSCP 804 and RRC 806.

The MTS may determine the traffic pattern for an associated small cell, for example, by accessing the BWR data to determine the amount of used timeslots versus unused timeslots. This traffic pattern determination may also be influenced by other factors, such as but not limited to the amount of traffic related to HARQ retransmissions. If a modem is receiving excess HARQ retransmissions due to its association with a UE via a first small cell, the UE causing the excess HARQ traffic may be moved to a second or subsequent small cell by the LTE MAC/RLC, the MTS, or by providing instruction from the MTS to the LTE MAC.

Mapping

In an embodiment LTE MAC/RLC 810 utilizes a UE-eNB(s) mapping system and method. Such as system and method tracks at least a portion of UEs and their association with at least a portion of LTE PHY 814, 824, 834. Other related data may also be maintained to facilitate mapping, scheduling, session set-up, etc.

In another embodiment MTS 808 utilizes a UE-RRUs mapping system and method for the same reasons detailed above.

Content Caching

In some embodiments content may be cached (called "content caching", "edge caching" or the like where content is push closer to the user or client) at one or more modems, at the MTS, with the L(LWA), TE PHY, or in a connected storage device associated with one or more of the above. This type of content caching facilitates one or more of edge computing (e.g., distributing computing with processing occurring in partially in a central location and partially in a location remote from the central location and closer to the user or client), near user storage of user data (e.g., storing or backing up data associated with a user of one or more devices, such as smart phone backup, person photos and videos, secure documents, home automation settings, passwords, etc.), near client storage of data (e.g., of frequently accessed data or data that is predictably more likely to be accessed by a client or clients on the same trunk line or near the remote data storage site). In the example of a DOCSIS network, content caching may be beneficial as DOCSIS downstream traffic may be broadcast traffic in some scenarios. Downlink Coordinated Multi Point operation (DL CoMP) may also benefit from content caching at the edge. Content cached at the edge may be accessed by the user "closest" to the storage site or, alternatively or additionally, may be accessed by or transmitted to a second user within a predetermined transmit time distance from the cached content where the predetermined transmit time distance is less than the transmit time distance for a central storage unit, such as a headend in a DOCSIS network, a mobile core in a mobile network, or a cloud computing center, or the like.

In a packet flow aspect of the present system and method, IP packets coming from PDCP 804 are directly forwarded to the MTS instead of forwarded to the LTE MAC/RLC 810. The MTS 808 then determines whether the packet should be directed to an RRU that is either LTE PHY or Wi-Fi PHY, based on the channel of the capacity information. MTS 808 reads at least a portion of the received IP packet data and includes functionality to initiate traffic steering, which may direct the IP packets to an RRU, such as RRU 874-878, via Wi-Fi or LTE.

For example, if data is sent via Wi-Fi, MTS 808 may transmit the data on the downstream directly from the MTS 808 to a Wi-Fi capable RRU, such as RRU 874.

In another example, if packet is sent via LTE, MTS 808 may transmit the data to LTE MAC/RLC 810, which queues the data, repackages it into one or more transport blocks, and sends the transport blocks back to CMTS, which then front hauls the transport block(s) to a designated RRU for transmission to its destination.

In another embodiment, MTS 808 may direct IP packets via both Wi-Fi and LTE, or some other available and compatible band for purposes of increasing throughput. In the LTE example, the back and forth transfer of data between CMTS and LTE MAC/RLC adds minimal propagation latency due to co-location within DU 872, or, in a combined embodiment, due to virtualization and combination of LTE MAC/RLC 810 and MTS 808.

LTE-WLAN Aggregation (LWA)

Figure 8B:
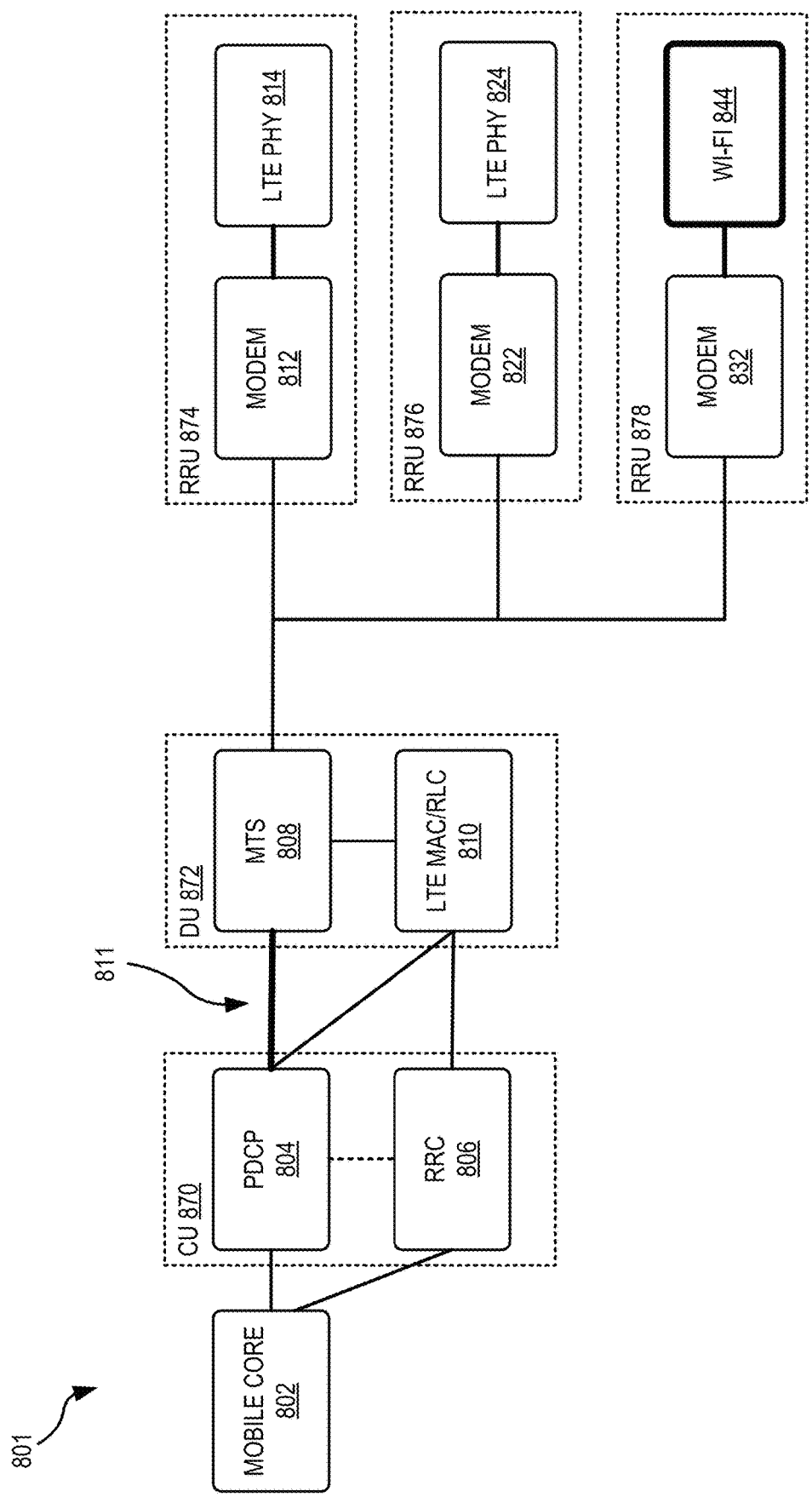
FIG. 8B shows one exemplary communication system in which the present network controlled dynamic small cell and Wi-Fi management system and method is implemented, in an embodiment.

FIG. 8B shows a system 801, which is similar to system 800 of FIG. 8A with the exception that system 801 includes an additional communication path 811 between PDCP 804 and MTS 808. The only other difference between the two systems is system 801 replaces LTE PHY 834 with Wi-Fi 844.

Communication path 811 provides a path for PDCP to transmit data to MTS 808 such that MTS 808 may determine if that data should be wireless transmitted from a Wi-Fi device, such as Wi-Fi 844, or from an LTE device, such as LTE PHY 814, 824. Such a method may utilize LTE-WLAN Aggregation (LWA).

LWA is a steering method that may be advantageously utilized with the present system and method, one example of such a system is system 801. LWA is one form of dynamic traffic steering that steers IP packets from LTE data bearers to be transmitted on LTE or Wi-Fi, such as LTE PHY 814-824 and Wi-Fi 844. Decision concerning which path to take is done at LTE PDCP layer, for example PDCP 804. In prior systems, the PDCP 804 layer in the CU 870 would handle these decisions. However, to make decisions, the PDCP 804 needs information such as the channel or the capacity about the LTE PHY and the Wi-Fi PHY, among other things. In the prior systems, the information needs to be transmitted from the DU to the CU. Due to the potential transmission delay (such as propagation and backhaul latency), the information could be stale when it arrives at the PDCP. The decision made by the PDCP to steer packets is therefore suboptimal. In the present system and method, since MTS 808 resides in DU 872 along with LTE MAC/RLC 810, MTS 808 can easily and expediently obtain the information about the LTE PHY 814, 824 and the Wi-Fi 844. By making MTS 808 handle the decisions to steer IP packets to be transmitted on LTE or on Wi-Fi, the present system and method can improve the optimality of the LWA steering methodology. That is, in the present system and method, PDCP 804 transmits it data to MTS 808. If that data is destined for Wi-Fi 844 then MTS 808 forwards it to Wi-Fi 844. If that data is destined for one of LTE PHY 814, 824 then MTS 808 transmits the data to LTE MAC/RLC 810, which process the data and forwards it to the appropriate LTE PHY device. The colocation, coordination, mapping, and data sharing between LTE MAC/RLC 810 and MTS 808 provide for a negligible latency when handing over LTE data from MTS 808 to LTE MAC/RLC 810, while reduces Wi-Fi latency due to the direct connection between PDCP 804 and MTS 808 and the immediate processing of that data.

Cell Coverage Area Resizing

FIGS. 9-10 and 11-12 are best viewed together.

Figure 9:
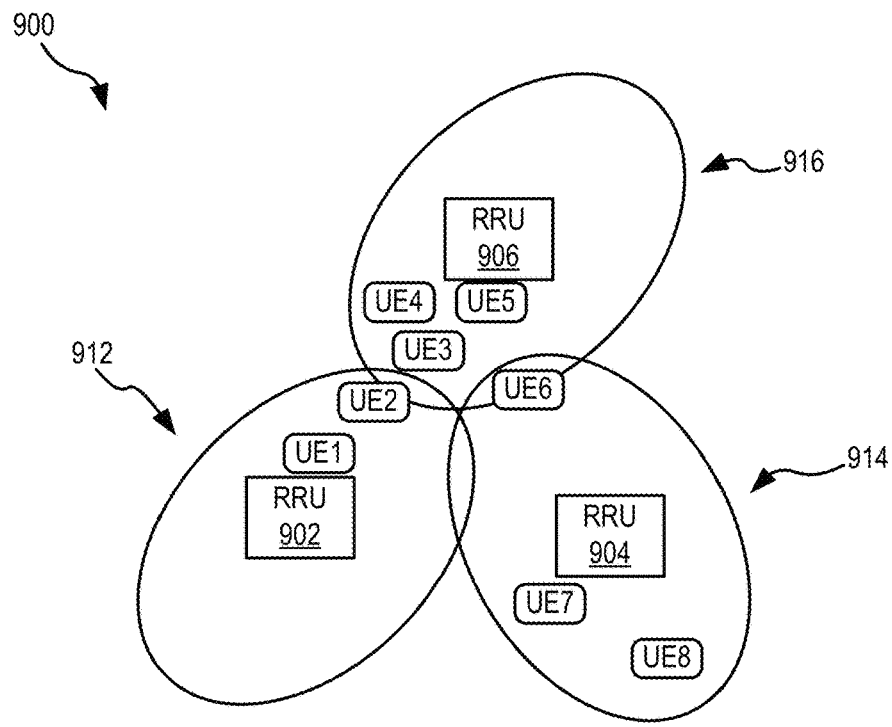
FIG. 9 shows a coverage area map of a small cell system, in an embodiment.
Figure 10:
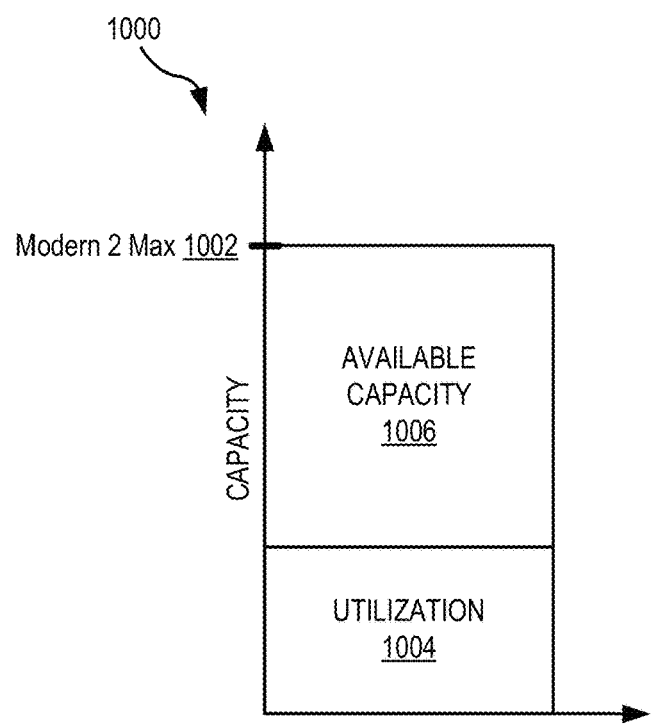
FIG. 10 shows a capacity graph for the small cell system of FIG. 9, in an embodiment.

FIG. 9 shows a small cell system 900. System 900 includes three remote radio units (RRU) 902-906, which are similar to RRUs 874-878, and eight UEs, UEs1-8. RRUs 902-906 have coverage areas 912-916, respectively with UEs1-2 in coverage area 912, UEs3-5 in coverage area 916, and UEs 6-8 in coverage area 914. FIG. 10 shows a capacity graph 1000 for modem 2, attached to RRU 906 which is similar to modem 812 attached to LTE PHY 814. FIG. 10 shows modem 2 having a maximum capacity 1002, a utilization 1004 of that capacity, and an available capacity 1006 which is the capacity available for allocation to devices or applications. Utilization 1004 is the capacity that is currently being allocated to UEs 3-5, and available capacity 1006 is the remaining capacity available for other non-LTE applications. Graph 1000 shows modem 2 is under utilizing its available capacity. This can be recognized by one or more aspects of DU 872, such as MTS 808 and or LTE MAC/RLC 810. Due to the close coordination between MTS 808 and LTE MAC/RLC 810, DU 872 may make changes to the small cell coverage area to better serve RRU 874-878's UE/clients, as shown in FIGS. 11-12.

Figure 11:
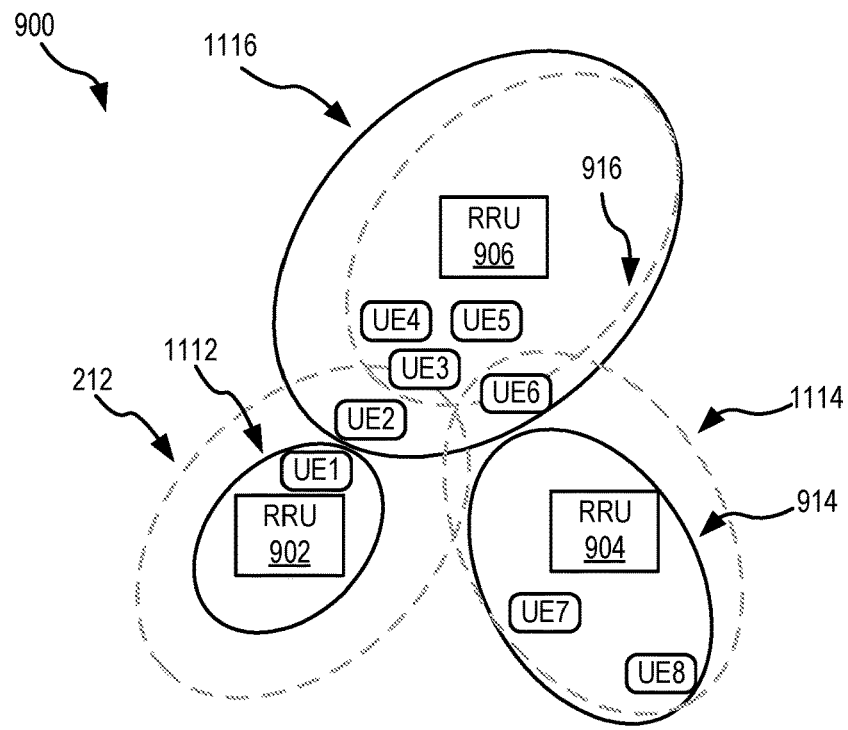
FIG. 11 shows an altered coverage area map for the small cell system of FIG. 9, in an embodiment.
Figure 12:
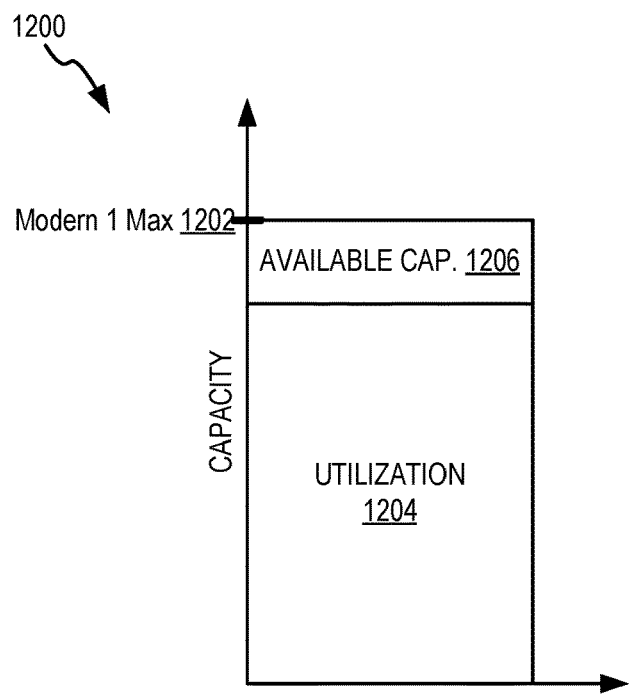
FIG. 12 shows an altered capacity graph for the small cell system of FIG. 11, in an embodiment.

FIG. 11 shows small cell system 900 with changes made to the small cell coverage areas 912, 914 and 916 to better utilize available capacity of modem 2 that is attached to RRU 906. As can be seen, coverage area 916 has been increased to coverage area 416. As such, modem 2 that is attached to RRU 906 now serves UE 2 and UE 6, in addition to the UEs 3-5 it already serves. Since modem 2 has a large amount of available capacity 1006 out of its max capacity of 1002, its coverage area has been increased to better utilize the available capacity. At the same time, coverage area 912 and 914 have been reduced to coverage area 1112 and 1114, respectively.

Capacity graph 1200, which represents the capacity utilization for modem 2 that is attached to the RRU 906 of FIG. 11, includes a maximum capacity 1002 as seen in FIG. 10, a utilization 1204 of the max capacity 1002, and an available capacity 1206 which is the capacity available for allocation to other non-LTE devices or applications. FIG. 12 shows that a significant portion of available capacity 1006 of FIG. 10 is reduced to available capacity 1206 and converted into utilization 1204 in order to serve additional UEs, UE2 and UE6, which has increased in comparison to utilization 1004.

By utilizing the coordinated LTE MCA/RLC 110 and MTS 108, which have access to all RRU 902-906 data as detailed above, system 900 has been optimized to take advantage of as much of modem 2's available capacity turning it into an increased utilized capacity.

Figure 13:
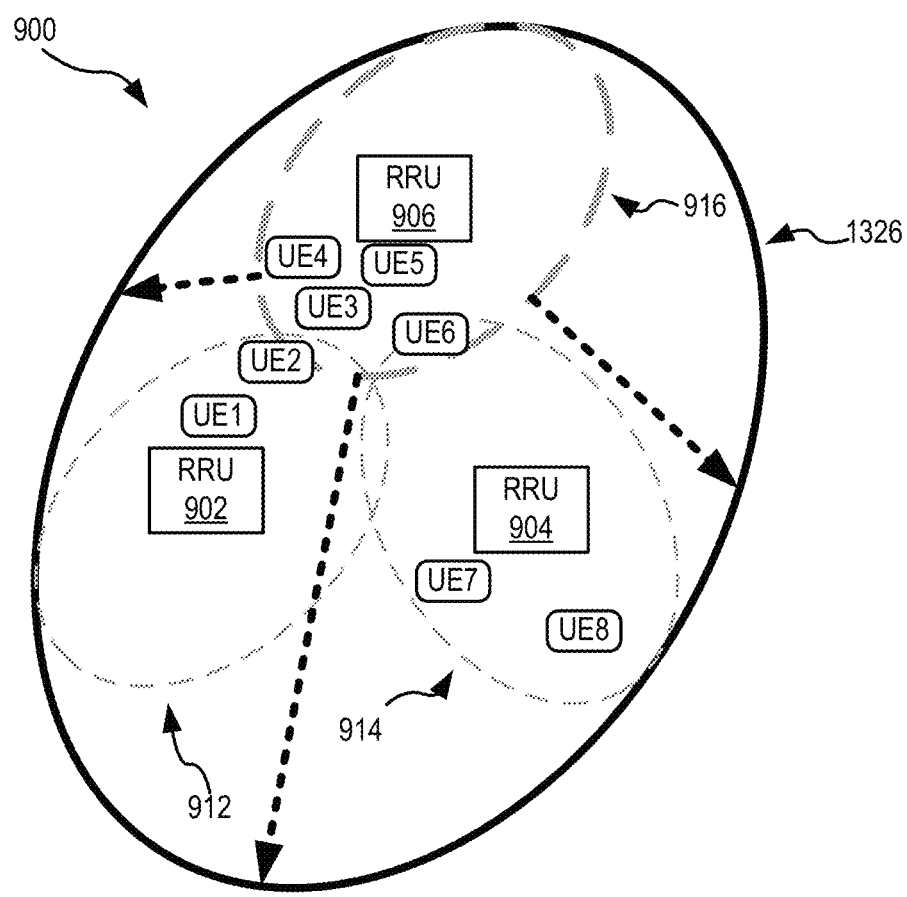
FIG. 13 shows an application of a power saving model based utilized in the system of FIG. 9, in an embodiment.

FIG. 13 is best viewed in combination with FIG. 9. FIG. 13 shows the application of a power saving model based on system 900. FIG. 13 includes RRUs 902-906 having original coverage areas 912-916, respectively, and a new coverage area 1326 for RRU 906.

Utilizing the power saving model, RRUs 902 and 904 are placed into a sleep mode, turned off, or otherwise configured by DU 872 to reduce coverage areas 912 covered by RRU 902 and 914 covered by RRU 904 to zero or close to zero. In addition RRU 906's coverage area 916 is increased to larger coverage area 1326 to support any UEs left unsupported by the turning off RRUs 902 and 904.

The power saving model implemented in FIG. 13 is coordinated by DU 872 for example, by LTE MCA/RLC 810 and/or MTS 808 as described above. Because DU 872 has access to all RRU 902-906 data as detailed above, system 900 has been optimized to take advantage of systems 900's low utilization periods to save power.

In an alternative embodiment where RRUs 902-906 exist within a macro cell coverage area (not shown) then all RRUs 902-906 are cycled off leaving the macro cell to support UEs or devices with coverage areas 912-916.

While the description of FIGS. 9-13 focus on resizing coverage area other ideas that are contemplated, such as coverage area shaping and implementing an inter-small cell time division multiplexing, both of which are discussed above.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A system for network controlled dynamic small cell management, comprising:
   a centralized unit, comprising:
      a Packet Data Convergence Protocol unit (PDCP), and
      a Radio Resource Controller (RRC);
   a distributed unit comprising:
      a Modem Termination System (MTS) including at least a Physical Layer (PHY) and a Media Access Control layer (MAC), and
      a virtualized Long Term Evolution Media Access Controller (v-LTE MAC) in close communication with the MTS and in communication with the PDCP and the RRC; and
   at least one Remote Radio Unit (RRU) comprising:
      a modem in communication with the MTS, and
      a Long Term Evolution Physical Layer unit (LTE PHY) in communication with the modem and being LTE wirelessly capable;
   wherein the v-LTE MAC includes a scheduler for scheduling LTE traffic and the MTS includes a scheduler for scheduling non-LTE traffic and for cooperating with the LTE scheduler to schedule LTE traffic.

2. The system of claim 1, further comprising a Wi-Fi capable Remote Radio Unit (Wi-Fi RRU) in communication with the MTS and a communication path between the PDCP and the MTS for transmitting Wi-Fi and LTE data from the PDCP the MTS.

3. The system of claim 2, wherein the MTS is operable to process the data received from the PDCP and determine if the data is Wi-Fi data or LTE data.

4. The system of claim 3, wherein the TMS includes functionality to forward the Wi-Fi data directly to the Wi-Fi RRU and LTE data to the LTE MAC device for LTE processing.

5. The system of claim 1, wherein the MTS and the v-LTE MAC are co-located.

6. The system of claim 1, wherein the MTS and the v-LTE MAC are implemented in the same hardware.

7. A system for network controlled dynamic small cell management, comprising:
   a distributed unit including,
      a Modem Termination System (MTS) including at least a backhaul Physical Layer (PHY) and a backhaul Media Access Control layer (MAC) in communication with at least one Remote Radio Unit (RRU), and
      a virtualized Long Term Evolution Media Access Controller (v-LTE MAC) in close communication with the MTS and in communication with the PDCP and the RRC.

8. The system of claim 7, further comprising a centralized unit including a Packet Data Convergence Protocol unit (PDCP) and a Radio Resource Controller (RRC).

9. The system of claim 7, wherein the Remote Radio Unit (RRU) comprises a modem in communication with the MTS, and a Long Term Evolution Physical Layer unit (LTE PHY) in direct link communication with the modem and being LTE wirelessly capable.

10. The system of claim 7, wherein the v-LTE MAC includes a scheduler for scheduling LTE traffic and the MTS includes a scheduler for scheduling non-LTE traffic and for cooperating with the LTE scheduler to schedule LTE traffic.

11. The system of claim 10, wherein the v-LTE MAC scheduler and the MTS scheduler is a single combined scheduler.

12. The system of claim 10, wherein the combined scheduler is in communication with shared LTE-MTS data stores which stores data associated with LTE and MTS scheduling, session set-ups, power management, coverage area sizing and shaping, UE hand-off between eNBs, and UE-to-eNodeB mapping.

13. The system of claim 11, wherein shared LTE-MTS data stores is a single combined data store accessible by both the MTS and the v-LTE MAC.

* * * * *